United States Patent Office 3,326,840
Patented June 20, 1967

3,326,840
COMPOSITION COMPRISING AN ETHYLENE CO-
POLYMER AND AN N-SUBSTITUTED AMIDE
Hardy E. Ross and Willard H. Wharton, Lake Jackson,
Tex., assignors to The Dow Chemical Company, Midland, Mich., a corporation of Delaware
No Drawing. Filed Mar. 5, 1964, Ser. No. 349,742
14 Claims. (Cl. 260—32.6)

This invention relates to ethylene copolymer compositions of improved properties, particularly in film form. More particularly it is concerned with copolymers of ethylene with aliphatic, ethylenically unsaturated carboxylic esters especially such copolymers in the form of thin films having improved blocking and slip characteristics.

It has been known for some time that one of the major drawbacks of thin films of polyethylene is the tendency to blocking and to poor slip properties. Numerous compositions and techniques have been developed to alleviate the problem with homopolymers of ethylene, i.e., polyethylene. However, the problem is even greater with copolymers of ethylene and unsaturated esters such as aliphatic esters of α,β-ethylenically unsaturated monobasic acids and terminally unsaturated esters of saturated aliphatic acids. In general the additives and procedures which were effective to give an acceptable solution to blocking and slip problems in polyethylene have not been successful in such ethylene copolymers to provide the desired degree of slip and resistance to blocking even when additional quantities of the known additives were used.

It is an object of this invention to provide compositions which will have adequate slip and especially adequate resistance to blocking.

It is a further object to provide copolymers of ethylene and unsaturated esters which have improved resistance to blocking and improved slip upon conversion to thin films and sheets.

Yet another object is to provide an additive and a procedure for imparting improved resistance to blocking and improved slip to films of ethylene copolymers without objectional effects on the optical properties of such films.

These and other objects will be apparent in the following description of the invention.

The composition of this invention comprises a copolymer of ethylene and an aliphatic ethylenically unsaturated carboxylic ester, e.g., an α,β-ethylenically unsaturated aliphatic ester or a terminally unsaturated ester of a saturated aliphatic carboxylic acid, having incorporated therein a small amount of a mono-N-substituted saturated carboxylic amide having a total of from 13 to 36 carbon atoms especially such N-substituted amides which have a pendant hydroxyl group on the nitrogen substituent.

The N-substituted amides used in the practice of this invention have the formula

wherein R is an aliphatic acyl radical having from 12 to 30 carbon atoms and R' is an aliphatic group having from 1 to 6 carbon atoms, especially in alkylol group.

Specific examples of R in the above formula are the acyl residues of the following saturated acids: lauric acid, stearic acid, myristic acid, palmitic acid, behenic acid, tridecanoic acid, pentadecanoic acid, lignoceric acid, cerotic acid, arachidic acid, margaric acid, octacosanoic acid, triacontanoic acid and the the like. Preferred examples of R' are the hydroxy substituted saturated aliphatic groups such as hydroxymethyl, hydroxyethyl, hydroxypropyl, hydroxybutyl and hydroxyhexyl.

In general the proportion of N-substituted amides used in the ethylene copolymer composition is within the range of from about 0.10 percent to about 2 percent, preferably from about 0.20 to 0.40 percent, by weight based on the copolymer weight.

The ethylene copolymers used in the practice of this invention are copolymers comprising the polymerization product of ethylene and a copolymerizable aliphatic, ethylenically unsaturated carboxylic ester, especially such an ester of an aliphatic monobasic carboxylic acid. The copolymerizable, a aliphatic ethylenically unsaturated carboxylic esters include esters of the formula

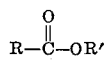

wherein both R and R' are aliphatic radicals and the ethylenic unsaturation of the ester may be present in either R or R', but not in both in the same monomeric ester. Additionally such unsaturation, if present in R, is α,β to the carboxylic group and, if present in R', is terminal, i.e., of the form

Mixtures of two, or more, ethylenically unsaturated esters of either or both types may be polymerized components in the ethylene copolymer if desired, e.g., a copolymer of ethylene, vinyl acetate and ethyl acrylate.

The copolymerizable, aliphatic, ethylenically unsaturated carboxylic esters useful as copolymerized components of the ethylene copolymers required for the practice of the invention are illustrated by acrylic esters and methacrylic esters and by vinyl esters of monobasic alkanoic acids. Specific examples of such esters are methyl acrylate, ethyl acrylate, n-propyl acrylate, isopropyl acrylate, n-butyl acrylate, isobutyl acrylate, n-hexyl acrylate, cyclohexyl acrylate, 2-ethylhexyl acrylate, methyl methacrylate, ethyl methacrylate, n-propyl methacrylate, isopropyl methacrylate, n-butyl methacrylate, isobutyl methacrylate, 2-ethylhexyl methacrylate, vinyl formate, vinyl acetate, vinyl propionate, vinyl n-butyrate, vinyl isobutyrate, and the like.

The ethylene copolymers of this invention desirably contain from about 0.5 percent to about 20 percent by weight of an ethylenically unsaturated ester based on the total copolymer weight. The balance of the copolymer composition, i.e., from about 80 percent to about 99.5 percent by weight, usually is ethylene. However, if desired there may be substituted for a portion of the ethylene small proportions, i.e., up to about 2 percent by weight, of other copolymerizable ethylenically unsaturated hydrocarbons, especially propylene—all percentages being based on the total copolymer weight. In general, for polymers of the same melt index value the problems of blocking and inadequate slip become greater as the proportion of ester in the copolymer increases. Accordingly, at the higher proportions of the ester component, e.g., about 20 percent by weight, significant improvements in blocking are attainable by the additive and process of this invention even though as low absolute values according to the blocking test may not be attained as with copolymers of lower proportion of ester, e.g., from about 0.5 to 10 percent by weight.

The copolymers useful in the practice of this invention may be prepared by polymerizing mixtures of the corresponding monomers using polymerization-grade monomers and apparatus, procedures, and conditions in accordance with the known art for high-pressure polymerization of ethylene. The polymerization may be carried out either in tubular or autoclave reactors at pressures from 15,000 to 35,000 pounds per square inch, or higher, and at temperatures from 300° F. to 550° F. using, at conventional concentration, the commercially available polymerization catalysts such as (a) peroxygen-type catalysts or (b) oxygen, or mixtures of (a) and (b) as well as other free radical producing materials such as the azo catalysts and others well known in the art. Examples of the peroxygen-type catalysts are diethyl peroxide, hydrogen peroxide, persuccinic acid, lauroyl peroxide, tetrahydronaphthalene peroxide, alkali metal and alkaline earth metal and ammonium persulfates, perborates, percarbonates and the like. Such catalysts are used in the range of 5 to 2000 p.p.m. (calculated as oxygen).

While the compositions of this invention consist essentially of the ethylene copolymer and the N-substituted saturated carboxylic amide, small amounts of conventional additives and modifiers useful in the plastic art, such as antioxidants, stabilizers, antistatic agents, carbon black, pigments, colorants, high melting waxes, and the like, can be blended therewith.

The composition comprising the ethylene copolymer and the N-substituted amide may be converted to film by well-known extrusion techniques such as by use of a circular die and appropriate conditions to produce blown tubing or by a flat-die process.

The compositions of this invention may be prepared by any method suitable for insuring a substantially uniform mixture of the components such as by mixing the copolymer and the other ingredients at a temperature at which the copolymer is plastic in a Banbury mixer a conventional rubber mill, heated rollers, or an extruder screw, or the like. The N-substituted saturated carboxylic amide may be blended in the form of a solid or a liquid (depending upon the temperature), a solution in an inert solvent, or a slurry in a non-solvent.

To illustrate more fully the practice of this invention to those skilled in the art, the following examples are given, without any limitations being intended thereby. In the examples all parts and percentages are by weight unless otherwise specified.

*Examples*

A terpolymer of 6 percent by weight of vinyl acetate, 0.5 percent by weight of propylene and the balance, 93.5 percent of the ethylene was compounded in a 2½-inch extruder with 150 p.p.m. of an antioxidant, 2,6-di-t-butyl-4-methylphenol, and 1000 p.p.m. of N-ethanol stearamide, the quantities (parts per million) being based on the weight of the copolymer. The resultant compositions were fabricated into 1.5 mil film by a conventional blown film extrusion process. Similar films were prepared in the same manner using 2500 p.p.m. and 5000 p.p.m. of N-ethanol stearamide. The blocking and slip of the films were determined in the manner hereinafter described with the results being shown in Table I.

TABLE I.—ETHYLENE COPOLYMER [1]

[Compositions of the invention]

| Additive | | Blocking, g. | Slip Angle, deg. |
|---|---|---|---|
| Kind | P.p.m. | | |
| N-ethanol stearamide | 1,000 | 35 | 65 |
| Do | 2,500 | <5 | 20 |
| Do | 5,000 | 0 | 24 |

[1] 93.5% of ethylene, 0.5% of propylene and 6% of vinyl acetate.

The combination of the invention has been illustrated, as shown in Table I, with the combination of N-ethanol stearamide and a copolymer of 93.5 percent of ethylene, 0.5 percent of propylene and 6 percent of vinyl acetate (all percentages by weight). However, when other N-substituted amides, e.g., N-methanol stearamide, N-butanol lauramide, and N-ethanol myristamide, are substituted for the N-ethanol stearamide, substantially the same results are obtained. Similarly such N-substituted amides may be used in combination with other ethylene copolymers containing not more than about 20 percent of copolymerized, aliphatic, ethylenically unsaturated esters, e.g., ethylene/vinyl acetate, ethylene/ethyl acrylate, ethylene/2-ethylhexyl methacrylate and ethylene/vinyl acetate/ethyl acrylate copolymers, to provide compositions having advantageous blocking and slip characteristics.

As noted above, the problem of blocking generally becomes greater as the proportion of ester in the copolymer increases. Thus, while a film of an ethylene copolymer containing 6 percent of copolymerized vinyl acetate as tested in Example 1 (see Table I) gave blocking values of less than 5 grams with 2500 p.p.m. of N-ethanol stearamide, a film of an ethylene copolymer containing 20 percent by weight of copolymerized vinyl acetate when blended with 3000 p.p.m. of the same additive had a blocking value of 25 grams whereas the same polymer blended with 5000 p.p.m. of oleamide (a well-known anti-block additive for polyethylene but not an example of this invention) had too great a blocking tendency to be measured by the hereinafter described test.

For comparison and contrast with the foregoing examples of the invention there are shown, in Tables II and III, test results for films prepared in the same manner from other compositions, not products of this invention because the combinations of polymers and additives are not within the scope of the compositions of the instant invention.

TABLE II.—ETHYLENE COPOLYMER [2] COMPOSITIONS

[Not compositions of the invention]

| Additive | | Blocking, g. | Slip Angle, deg. |
|---|---|---|---|
| Kind | P.p.m. | | |
| None | 0 | >50 | >67 |
| Erucylamide | 1,000 | >50 | >67 |
| Do | 5,000 | 28 | 18 |
| Oleamide | 1,000 | >50 | >67 |
| Do | 3,000 | 35 | 25 |
| Do | 5,000 | 30 | 15 |
| Oleamide | 500 | } 48 | 62 |
| Calcium Carbonate | 1,000 | | |
| Oleamide | 3,000 | } 23 | 11 |
| Calcium Carbonate | 1,500 | | |

[2] 93.5% of ethylene, 0.5% of propylene, 6% of vinyl acetate.

TABLE III.—POLYETHYLENE COMPOSITIONS

[Not examples of the invention]

| Additive | | Blocking, g. | Slip Angle, deg. |
|---|---|---|---|
| Kind | P.p.m. | | |
| None | 0 | >50 | >67 |
| N-ethanol stearamide | 1,000 | <5 | 20 |
| Erucylamide | 1,000 | 6 | 10 |
| Do | 3,000 | <5 | 10 |
| Oleamide | 1,000 | 27 | 17 |
| Do | 3,000 | <5 | 10 |
| Do | 5,000 | <5 | 9 |
| Oleamide | 500 | } <5 | 11 |
| Calcium Carbonate | 1,000 | | |
| Oleamide | 3,000 | } <5 | 10 |
| Calcium Carbonate | 1,500 | | |

The compositions of Table II are not within the scope of the invention because, while the copolymer is within the scope of composition of the invention, the additives are not of the class of compounds which in combination with such copolymers provide the advantages of the new discovery. The compositions of Table III are the materials of the most closely related prior art in that they are known polyethylene compositions containing known additives. A comparison of the results given in Table III with those given in Table II shows that with the exception of N-ethanol stearamide (shown in Table I as an example of the invention) the additives which were effective in reducing the blocking of polyethylene to acceptable levels, i.e., to less than about 25 grams, preferably to less than about 5 grams, were not similarly effective with copolymers of ethylene and aliphatic, ethylenically unsaturated carboxylic esters. Parallel comparisons apply to other prior art anti-block additives for polyethylene; e.g., glyceryl monoesters of higher fatty acids; unsaturated carboxylic amides having no substituent on the nitrogen atom such as vaccenamide; metallic soaps of fatty acids, such as barium, calcium, zinc and aluminum salts of lauric, myristic, palmitic, stearic, behenic, elaidic and erucic acids.

The "blocking" and "slip" characteristics of films prepared from the combination of ethylene copolymers and additives of this invention were measured according to the following descriptions.

*Film slip*

Film slip was recorded as the angle of an inclined plane at which a film of the material being tested begins to slide on another film of the same material and was determined according to the following description of the slip angle test. The slip angle, in degrees, is measured on film which has been aged overnight in an enclosure kept at 50±5 percent relative humidity and at a temperature of 73.4°±1° F. The equipment used consists of a block of steel 4½" x 2½" x ¾" which is covered with foam rubber of ¼" thickness and a plane surface whose angle of inclination to the horizontal during the test is changed by a motor at a constant rate of 2.2 degrees per second. One specimen of the film being tested is fastened smoothly to the rubber covered block and another sample to the inclinable plane previously adjusted to be in a substantially horizontal position. The film covered block is placed on the film covered, inclinable plane, the motor is started and the angle at which the block begins to slide is recorded.

*Blocking*

The block characteristics of the films were determined by measuring the force necessary to separate two pieces of film having 16 square inches of interface in accordance with the following description: Samples of the film are aged as described in the film slip test then are fastened to two smooth surfaced blocks, the film covered blocks are positioned such that the film surfaces are in contact (16 in.² of contact surface), a separating force is exerted on the blocks in a direction at right angles to the film surface, and the amount of force, in grams, required to separate the films is recorded as the block value.

What is claimed is:

1. A plastic composition comprising a major portion of a mixture of an ethylene copolymer and a mono-N-substituted saturated carboxylic amide having the formula

wherein R is an aliphatic acyl radical having from 12 to 30 carbon atoms and R' is an hydroxy-substituted saturated aliphatic group having from 1 to 6 carbon atoms; said copolymer containing from about 0.5 percent to about 20 percent by weight of a copolymerized aliphatic, ethylenically unsaturated, carboxylic ester and said amide being present in an amount from about 0.10 percent to about 2 percent by weight; all percentages being based on the weight of the copolymer in the composition.

2. A plastic composition according to claim 1 in which the mono-N-substituted saturated carboxylic amide is N-ethanol stearamide.

3. The plastic composition of claim 1 in which the ethylenically unsaturated ester is vinyl acetate.

4. The plastic composition of claim 1 in which the amount of mono-N-substituted saturated carboxylic amide is from about 0.20 percent to about 0.40 percent by weight.

5. A plastic composition comprising a major portion of a mixture of an ethylene copolymer and a mono-N-substituted saturated carboxylic amide having the formula

wherein R is an aliphatic acyl radical having from 12 to 30 carbon atoms and R' is an hydroxy-substituted saturated aliphatic group having from 1 to 6 carbon atoms; said copolymer containing from about 0.5 to about 20 percent by weight of a copolymerized, aliphatic, ethylenically unsaturated carboxylic ester and a minor amount of copolymerized propylene; and said amide being present in an amount from about 0.10 percent to about 2 percent by weight; all percentages being based on the weight of the copolymer in the composition.

6. The plastic composition of claim 5 in which the unsaturated ester is a vinyl ester of an alkanoic monobasic acid.

7. The plastic composition of claim 5 in which the ethylenically unsaturated ester in vinyl acetate.

8. The composition of claim 5 in which the mono-N-substituted saturated carboxylic amide is N-ethanol stearamide.

9. A plastic film composition having improved slip and improved resistance to blocking comprising a major portion of a mixture of an ethylene copolymer and a mono-N-substituted saturated carboxylic amide having the formula

wherein R is an aliphatic acyl radical having from 12 to 30 carbon atoms and R' is an hydroxy-substituted saturated aliphatic group having from 1 to 6 carbon atoms; said copolymer containing from about 0.5 percent to about 20 percent by weight of a copolymerized aliphatic, ethylenically unsaturated carboxylic ester, and said amide being present in an amount from about 0.10 percent to about 2 percent by weight, all percentages being based on the weight of the copolymer in the composition.

10. A plastic film composition having improved slip and improved resistance to blocking comprising a major portion of a mixture of an ethylene copolymer and a mono-N-substituted saturated carboxylic amide having the formula

wherein R is an aliphatic acyl radical having from 12 to 30 carbon atoms and R' is an hydroxy-substituted saturated aliphatic group having from 1 to 6 carbon atoms; said ethylene copolymer containing copolymerized propylene in an amount up to about 2 percent and from about 0.5 percent to about 20 percent by weight of a copolymerized aliphatic, ethylenically unsaturated carboxylic ester; and said amide being present in an amount from about 0.10 percent to about 2 percent by weight, all percentages being based on the weight of the copolymer in the composition.

11. The plastic composition of claim 1 in which R' is hydroxyethyl.

12. The plastic composition of claim 5 in which R' is hydroxyethyl.

13. The plastic film composition of claim 9 in which R' is hydroxyethyl.

14. The plastic film composition of claim 10 in which R' is hydroxyethyl.

References Cited

UNITED STATES PATENTS

| | | |
|---|---|---|
| 2,953,541 | 9/1960 | Pecha et al. |
| 2,953,551 | 9/1960 | White _____ 260—86.7 |
| 3,183,202 | 5/1965 | Baird et al. |
| 3,197,425 | 6/1965 | Konig et al. |
| 3,240,766 | 3/1966 | Thomson et al. ____ 260—87.3 |

MORRIS LIEBMAN, *Primary Examiner.*

L. T. JACOBS, *Assistant Examiner.*